United States Patent
Muller et al.

(10) Patent No.: US 7,052,222 B2
(45) Date of Patent: May 30, 2006

(54) FASTENING ELEMENT

(75) Inventors: Franz Muller, Wiesbaden (DE); Peter Henrich, Kriftel (DE); Ludbert Hagemann, Gesslau (DE)

(73) Assignee: SW Stanzwerk Glarus AG, Glarus (CH)

( * ) Notice: Subject to any disclaimer, the term of this patent is extended or adjusted under 35 U.S.C. 154(b) by 0 days.

(21) Appl. No.: 11/000,057

(22) Filed: Dec. 1, 2004

(65) Prior Publication Data

US 2005/0180842 A1  Aug. 18, 2005

(30) Foreign Application Priority Data

Dec. 4, 2003  (EP) ................... 03027699

(51) Int. Cl.
*F16B 27/00* (2006.01)

(52) U.S. Cl. .................................... 411/84

(58) Field of Classification Search ............ 411/549, 411/108–113, 432, 84–85, 551–553, 438, 411/544; 188/379–380; 267/170, 174, 179, 267/70
See application file for complete search history.

(56) References Cited

U.S. PATENT DOCUMENTS

| | | | | |
|---|---|---|---|---|
| 890,285 A | * | 6/1908 | Krantz | 138/159 |
| 1,933,536 A | * | 11/1933 | Awbrey | 52/708 |
| 2,380,379 A | * | 7/1945 | Attwood | 248/163.1 |
| 2,681,679 A | * | 6/1954 | Poupitch | 411/111 |
| 2,696,139 A | * | 12/1954 | Attwood | 411/427 |
| 2,767,609 A | * | 10/1956 | Cousino | 411/436 |
| 2,969,571 A | * | 1/1961 | Vander Sande et al. | 411/522 |
| 3,005,292 A | * | 10/1961 | Reiland | 52/99 |
| 3,295,805 A | * | 1/1967 | Girard | 248/68.1 |
| 3,429,601 A | * | 2/1969 | Bremers | 403/230 |
| 3,483,910 A | * | 12/1969 | Van Huffel et al. | 411/112 |
| 3,493,025 A | * | 2/1970 | Van Huffel et al. | 411/103 |
| 4,146,074 A | * | 3/1979 | Kowalski | 411/111 |
| 4,263,952 A | * | 4/1981 | Kowalski | 411/112 |
| 4,285,379 A | * | 8/1981 | Kowalski | 411/85 |
| 4,315,393 A | * | 2/1982 | Schack et al. | 52/710 |
| 4,410,298 A | * | 10/1983 | Kowalski | 411/112 |
| 4,460,299 A | * | 7/1984 | Kowalski | 411/85 |
| 4,545,697 A | * | 10/1985 | Verdenne et al. | 403/230 |
| 4,575,295 A | * | 3/1986 | Rebentisch | 411/85 |
| 4,645,393 A | * | 2/1987 | Pletcher | 411/84 |
| 4,661,030 A | * | 4/1987 | Delmastro | 411/85 |
| 4,666,355 A | * | 5/1987 | Stover | 411/85 |
| 4,708,554 A | * | 11/1987 | Howard | 411/84 |
| 4,770,378 A | * | 9/1988 | Onishi et al. | 248/68.1 |
| 4,784,552 A | * | 11/1988 | Rebentisch | 411/85 |

(Continued)

FOREIGN PATENT DOCUMENTS

GB  2 029 918 A  3/1980

*Primary Examiner*—Robert J. Sandy
*Assistant Examiner*—Jeffrey Sharp
(74) *Attorney, Agent, or Firm*—Douglas E. Jackson; Stites & Harbison PLLC

(57) ABSTRACT

A quick-fastening element (10) is used to anchor loads to profile rails (12a, 12b). It has a mounting part (18), a cage (20), and a movable closing nut (22). To improve the screwing-in motion and to enable more universal use of the quick-fastening element, it is proposed that a first spring element (24) is provided between the closing nut (22) and the mounting part (18), and a second spring element (26) is provided between the end of the cage (20) and the closing nut (22), and the closing nut (22) is in a position of equilibrium.

12 Claims, 3 Drawing Sheets

U.S. PATENT DOCUMENTS

Figure 1:
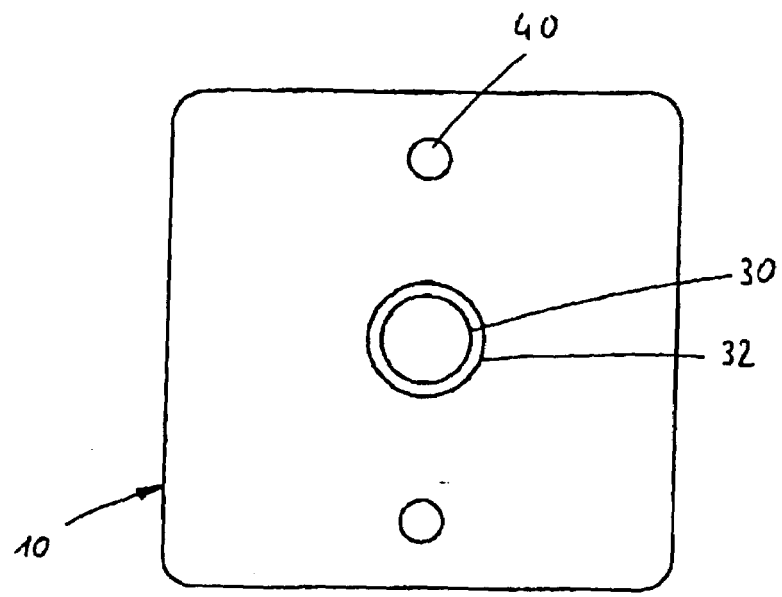
Figure 2:
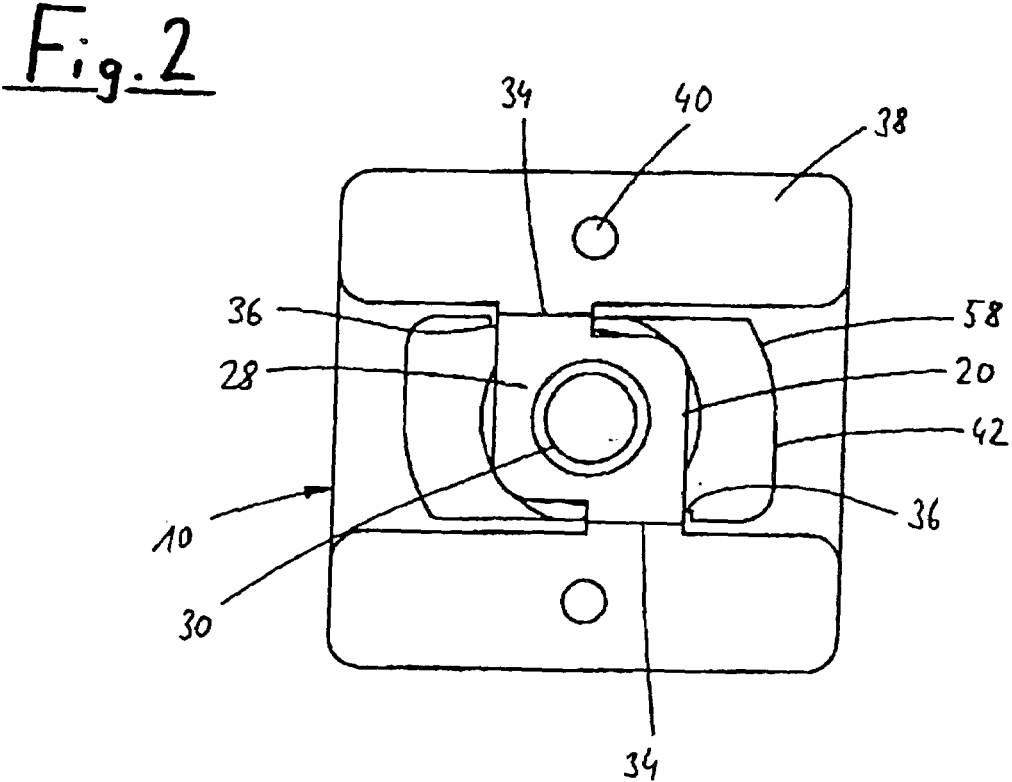

| | | | |
|---|---|---|---|
| 4,789,286 A * | 12/1988 | Laput | 411/84 |
| 4,830,531 A * | 5/1989 | Condit et al. | 403/348 |
| 4,840,525 A * | 6/1989 | Rebentisch | 411/85 |
| 4,901,958 A * | 2/1990 | Kelso | 248/59 |
| 4,917,553 A * | 4/1990 | Muller | 411/85 |
| 4,948,313 A * | 8/1990 | Zankovich | 411/85 |
| 5,118,233 A * | 6/1992 | Mitchell | 411/5 |
| 5,199,836 A * | 4/1993 | Gogarty | 411/84 |
| 5,271,586 A * | 12/1993 | Schmidt | 248/58 |
| 5,375,798 A * | 12/1994 | Hungerford, Jr. | 248/58 |
| 5,489,173 A * | 2/1996 | Hofle | 411/85 |
| 5,624,217 A * | 4/1997 | Hungerford, Jr. | 411/85 |
| 5,655,865 A * | 8/1997 | Plank et al. | 411/85 |
| RE36,681 E * | 5/2000 | Rinderer | 411/85 |
| 6,872,038 B1 * | 3/2005 | Westlake | 411/85 |

* cited by examiner

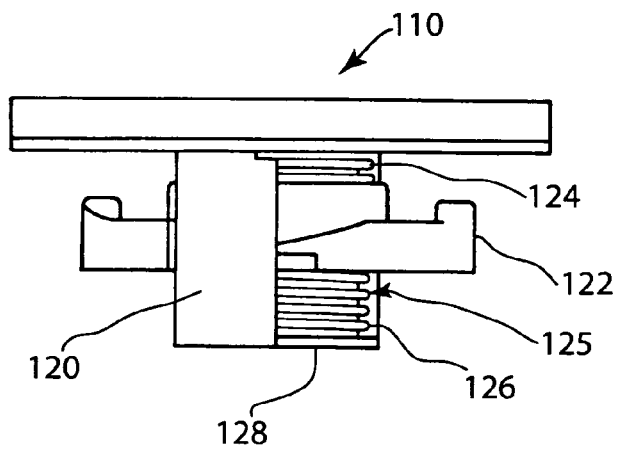
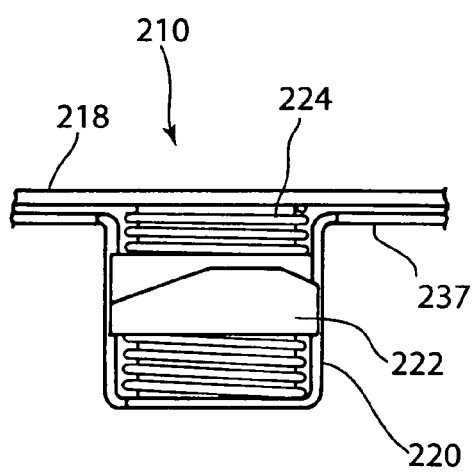
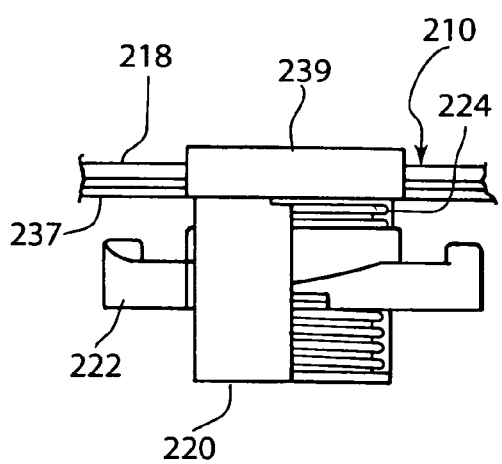

FASTENING ELEMENT

The invention relates to a quick-fastening element for anchoring loads to a profile rail with a longitudinal slot and a substantially C-shaped profile cross section, having a mounting part located outside the rail, having a cage connected to the mounting part, which cage protrudes into the slot of the profile rail and forms an axial guide against rotation relative to the mounting part for a closing nut which has an elongated shape and is rotatable with the mounting part, so that it engages beneath the leg ends oriented toward one another, and having elastic means, which press the closing nut, in the installed position, against the underside of the inward-bent leg ends of the profile rail and pull the mounting part from above against the inward-bent leg ends of the profile rail.

A quick-fastening element of this kind is known from European Patent Disclosure EP 0 076 765 B1. In the version shown there, a prestressed helical spring presses the closing nut against the mounting part from below, and the closing nut, embodied as a simple sheet-metal part, is bent on its flanks located at the front in the screwing-in direction, so that it can be rotated to below the leg ends of the profile rail.

It is problematic that with relatively thick metal sheets for the profile rail, or with profile rails in which the inward-pointing leg ends are additionally bent in the direction of the bottom of the rail, screwing the quick-fastening element into the preassembled clamping position can be more difficult or impossible, and especially using one of the same quick-fastening element with different profile rails is made more difficult.

The object of the present invention is to create a quick-fastening element which can be adapted more easily to whichever profile rail is employed.

According to the invention, this object is attained by a quick-fastening element of the type described at the outset, in which a first spring element is provided between the closing nut and the mounting part, and a second spring element is provided between the end of the cage protruding into the slot and the closing nut, and in the outset position, two spring elements retain the closing nut in a position of equilibrium.

By the disposition of the two spring elements, it is possible to vary the spacing between the closing nut and the mounting part by means of the selection of spring elements, so that the closing nut can readily be disposed in the desired position, and screwing the quick-fastening element in and thus provisionally fixing it on the profile rail can be performed securely in every case.

It is conceivable either to provide separate spring elements above and below the closing nut, or to embody the two spring elements in one piece and to dispose the closing nut centrally on this one spring element. By means of the position of the closing nut on the spring element, such as a helical spring, the spacing from the mounting part is adjusted.

In a further preferred embodiment of the invention, it is provided that the closing nut, in the region of its ends on the top, has two grooves which are engaged in the installed state by leg ends of the profile rail that point in the direction of the closing nut inserted into the profile rail. In such an embodiment, when the quick-fastening element is screwed in, the leg ends snap into the groove and thus assure a good hold of the quick-fastening element in this provisionally fixed position.

With this kind of embodiment of the closing nut, which is preferably embodied as a forged part, it is also conceivable for one and the same quick-fastening element to be inserted on the one hand into profile rails with downward-bent ends of the legs that point inward or into simple C-shaped profile rails that lack these bent ends. In the latter case, the top of the closing nut, in the screwed-in state, rests on the underside of the leg ends, while in the other case, the closing nut is braced via the groove bottom on the downward-pointing leg ends.

In a further preferred embodiment of the invention, it is provided that at least the outer edges of the grooves are chamfered or rounded on their ends located in front in terms of the screwing-in direction. Such rounded or chamfered ends make it easier to screw the quick-fastening element into its provisionally clamped position, especially whenever no additional variation in the position of the nut is contemplated, for instance by means of a moving part on the mounting part or a bolt already screwed into the closing nut.

It may also be expedient for the rear ends also to be chamfered or rounded, to enable dismantling the quick-fastening element, for instance if it has been inserted at the wrong place. To provide a certain protection against overly easy removal, it may be useful to embody the rear ends as more steeply inclined than the front ends.

One possible way, already suggested above, of varying the location of the closing nut to facilitate screwing it in can be implemented by providing that for instance the mounting part comprises a contact plate rigidly joined to the cage and a mounting plate on which the first spring is braced and which is movable counter to the restoring force of this spring in the direction of the contact plate, whereupon the closing nut moves away from the contact plate. When a load is screwed on, the raised mounting plate is in conclusion pressed against the contact plate again, while the closing nut, resting on the leg ends, maintains its same position relative to the contact plate. It is expedient to define the spacing of the mounting plate from the contact plate by means of stops, which can simultaneously also form guides for the mounting plate, so that the mounting plate is guided in controlled fashion between its spring-loaded raised position and its pressed-down position.

A further provision with a view to universal useability of the quick-fastening element in various profile rails may comprise selecting the length and geometry of the closing nut such that the closing nut is secured against overtightening by contact of their outer surfaces against the inner walls of the legs, and/or that two parallel outer flanks are provided in the shaft region of the closing nut, spaced apart such that they form an overtightening prevention device by contact with the slot flanks of the profile rail. If the outer flanks are provided in the shaft region and the geometry of the closing nut is also selected accordingly, then an overtightening prevention device is possible both on the inner flanks of the legs and on the flanks of the slot, so that overtightening prevention is also achieved if different profile rails are used.

Figure 3:
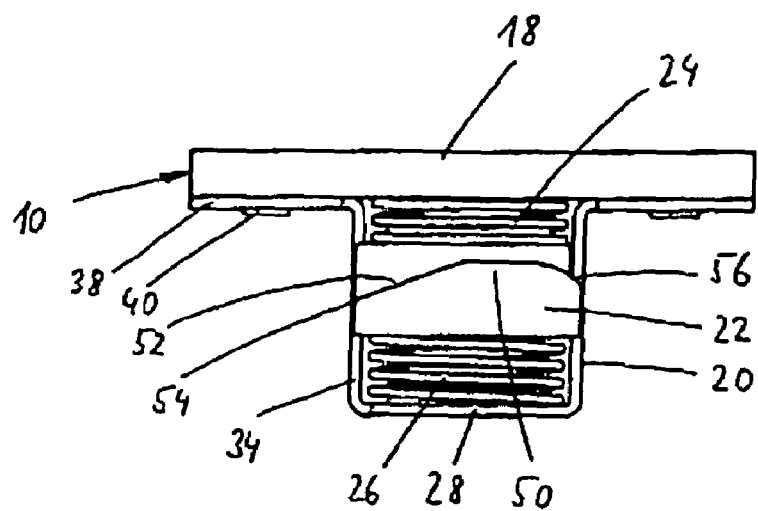
Figure 4:
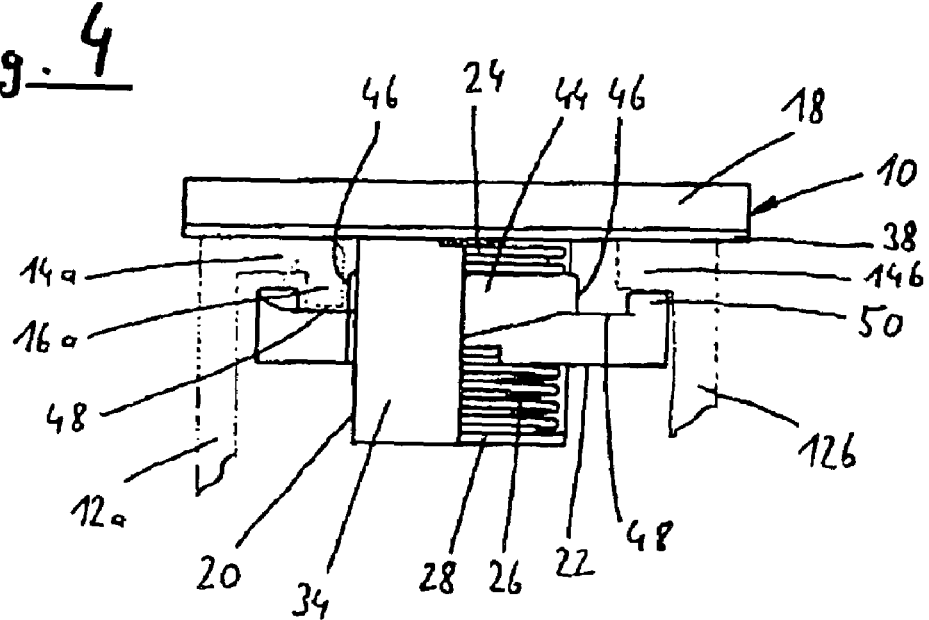

One exemplary embodiment of the invention will be described below in conjunction with the accompanying drawings. Shown are:

FIG. 3, a side view of the quick-fastening element;

FIG. 4, a side view, rotated by 90°, of the quick-fastening element;

FIG. 5, a side view, rotated by 90° of an alternative quick-fastening element;

FIG. 6, a side view of another alternative quick-fastening element; and

FIG. 7, a side view, rotated by 90°, of the another quick-fastening element.

The quick-fastening element 10 shown in FIGS. 1 through 4 serves to anchor loads (not shown) to profile rails 12a, 12b (see FIG. 4) of substantially C-shaped cross section. Such profile rails may, as shown on the right-hand side in FIG. 4, have leg ends 14b that are bent over inward, or—as shown on the left-hand side in FIG. 4—leg ends 14a bent over inward, with leg ends 16a themselves additionally bent in the direction of the bottom of the profile rail.

The quick-fastening element 10 substantially comprises a mounting part 18, which here comprises a substantially square plate; a cage 20, affixed to the mounting part 18; and a closing nut 22, guided axially nonrotatably in the cage, and also a first spring element 24, which is disposed between the mounting part 18 and the closing nut 22, and a second spring element 26, which is provided between the closing nut 22 and a bottom region 28 of the cage 20. In the outset position shown in FIG. 3, the two spring elements 24, 26 keep the closing nut 22 in a position of equilibrium. The closing nut 22 is provided with a female thread 30, into which a screw, threaded bolt or the like, can be screwed through a circular opening 32 in the mounting part 18, in order to attach the load and fix the quick-fastening element 10 to the profile rail 12a, 12b.

Besides the bottom region 28, already mentioned, for bracing the second spring element 26, the cage also has lateral legs 34, which engage lateral recesses 36 (see FIG. 2) of the closing nut, so that the closing nut is movably held only in the axial direction relative to the mounting part 18. Moreover, the cage 20 has retaining tabs 38, which are mounted on the mounting part 18 with the aid of rivets 40.

The closing nut 22, which may be fabricated as a forged part, stamped part, cast part, or—for less heavy-duty load situations—as a plastic part has an elongated shape; the width is selected such that the closing nut can be inserted into the central slot in a profile rail, while its length is dimensioned such that, after the quick-fastening element has been turned 90°, it securely engages beneath the inward-pointing leg ends 14a, 14b of the respective profile rail 12a, 12b.

The outer faces 42 on the short ends of the closing nut 22 are spaced apart from one another by a distance that, when the profile rail 12b shown in FIG. 4 is used, is selected to be slightly less than the inside width of the profile rail 12b, so that these outer faces 42 are for protection against overtightening of the quick-fastening element 10. Protection against overtightening can also be attained by providing that flanks 46 provided in a shaft region 44 are at a spacing corresponding approximately to the slot width of a profile rail 12a, so that the overtightening prevention is thus attained, not between the inner walls of the legs and the outer faces 42, but between the flanks of the slot and the flanks 46.

In order to achieve a secure seat of the closing nut 22 in the case of the profile rail shape shown on the left in FIG. 4, with leg ends 16a bent downward toward the bottom of the profile rail, the closing nut, on its top oriented toward the mounting part 18, has two grooves 48, which extend parallel to the short sides and are embodied to suit the geometry of the profile rail 12a. If a profile rail 12b that does not have this additional bending is used, then the closing nut 22 rests with the tops of the outer groove walls 50 against the underside of the inward-bent leg ends 14b.

To make it easier to turn the quick-fastening element 10 into the profile rail 12a, 12b, especially whenever the groove regions 48 must snap into place under the profile rails 16a, the groove walls are provided with a chamfer 52 on the front, in terms of the screwing-in direction, whose starting point 54 upon insertion into the profile rail is located below the leg end 16a that is-bent toward the rail bottom, so that the chamfer 52 can engage there, and when the quick-fastening element 10 is turned, the chamfer correspondingly moves the nut 22 away from the mounting part 18, until the leg ends 16a can snap into place in the groove regions 48 by the spring action. On the opposite end, the groove walls 50 are provided with a rounding 56, which makes it easier to remove the quick-fastening element 10 if it has mistakenly been inserted at the wrong point of the profile rail.

Rounded flank regions 58 on the outer flanks 42 prevent the closing nut 22 from becoming jammed before the preassembled clamping position is reached.

The quick-fastening element 10 shown in the drawings may be varied in various ways. For instance, it is conceivable to embody the mounting part 18 in two parts as shown in FIGS. 6 and 7. In this embodiment of an element 210, element 210 has a lower contact part 237, joined rigidly to the cage 220, and a movably guided mounting plate or part 218, on which the first spring 224 is braced. With this provision, the location of the closing nut 222 can also be varied by pressing down on the mounting plate 218, so that the closing nut 222 can more easily engage beneath the leg ends and can be turned into its clamping position with less resistance. It will be appreciated that the spacing of the mounting plate from the contact plate is defined by stops 239, which stops are also guides for the mounting plate 218.

Instead of two separately embodied springs 24, 26, as depicted for element 10, another alternative embodiment of an element 110 is depicted in FIG. 5 as having a one-piece spring element 125. Spring element 125 can thus be conceived as having an upper part 126 located adjacent the mounting part 118 and a lower part located adjacent the bottom region 128 of the cage 20. With this embodiment, the closing nut 22 anchored centrally at a desired point along the conceptual thread courses of this spring element.

The invention claimed is:

1. A quick-fastening element for anchoring loads to a rail system having a pair of opposed profile rails with a longitudinal slot therebetween and with a substantially C-shaped profile cross section, said element comprising:
   a mounting part which is located on top of the rail system;
   a cage connected to the mounting part, which cage protrudes downwardly into the slot between the profile rails and forms an axial guide against rotation of the mounting part relative to the profile rails;
   a closing nut which has a laterally elongated shape, the closing nut being rotatable relative to the mounting part (i) from an uninstalled position not engaged with inward-bent leg ends of the profile rails oriented toward one another (ii) to an installed position where said closing nut engages beneath the inward-bent leg ends oriented toward one another; and
   a first spring element provided between the closing nut and the mounting part which pulls the mounting part from above against the inward-bent leg ends of the profile rails, and a second spring element provided between an end of the cage protruding into the slot and the closing nut which presses the closing nut, in the installed position, against an underside of the inward-bent leg ends of the profile rails, and whereby, in the uninstalled position, the first and second spring elements retain the closing nut in a position of equilibrium between the mounting part and the end of the cage.

2. The quick-fastening element of claim 1, wherein the first and second spring elements are embodied as a single spring device, and wherein the closing nut is disposed centrally on said single spring device.

3. The quick-fastening element of claim 1, wherein first and second spring elements are helical spring elements.

4. The quick-fastening element of claim 1, wherein the closing nut has two grooves on a top thereof in the region of elongate ends thereof; and wherein the inward-bent leg ends of the profile rails point in the direction of the closing nut so that when the closing nut is in the installed position, respective inward-bent leg ends are inserted into respective grooves.

5. The quick-fastening element of claim 4, wherein at least outer walls of the grooves are chamfered or rounded on ends thereof located in front in terms of a direction from the uninstalled to the installed positions.

6. The quick-fastening element of claim 5, wherein rear ends of the grooves are likewise chamfered or rounded.

7. The quick-fastening element of claim 6, wherein the rear ends are inclined more steeply than the front ends.

8. The quick-fastening element of claim 1, wherein a length and geometry of the closing nut are selected such that the closing nut is secured against overtightening by contact of outer surfaces thereof against respective adjacent walls of inward-bent legs of the profile rails.

9. The quick-fastening element of claim 1, wherein two parallel outer flanks are provided in a shaft region of the closing nut, which flanks are spaced apart to prevent overtightening by contact with adjacent slot flanks of the profile rails.

10. The quick-fastening element of claim 1, wherein the mounting part comprises a contact plate rigidly joined to the cage and a mounting plate on which the first spring is braced and which is movable to counter the restoring force of the first spring in the direction of the contact plate, whereby the closing nut is similarly movable away from the contact plate.

11. The quick-fastening element of claim 10, wherein the spacing of the mounting plate from the contact plate is defined by stops.

12. The quick-fastening element of claim 11, wherein the stops have holders, which form guides for the mounting plate.

* * * * *